Nov. 27, 1945.  R. L. PARK  2,389,634

LOCK NUT

Filed Dec. 23, 1941

RANSOM L. PARK
INVENTOR.

BY *Harold L. Cook*

ATTORNEY

Patented Nov. 27, 1945

2,389,634

UNITED STATES PATENT OFFICE 2,389,634

LOCK NUT

Ransom L. Park, Monmouth, Oreg.

Application December 23, 1941, Serial No. 424,107

10 Claims. (Cl. 151—15)

The present invention relates to new and useful improvements in lock nuts, and has for its primary object the provision of a nut including an internal locking ring adapted for rotation independently of the nut to produce a binding engagement with the threads of the bolt whereby the nut is secured against movement thereon.

A further object is to provide a lock nut embodying a locking ring adapted for manipulation through an opening in the side wall of the nut whereby the locking ring may be moved into and out of locking position with respect to the nut.

A still further object of the invention is to provide a device of this character of a simple and practical construction which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawing forming a part hereof, wherein like numerals refer to like parts throughout.

Figure 1:
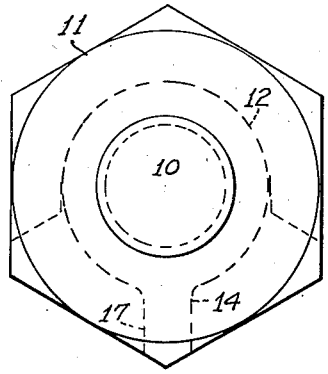
Figure 2:
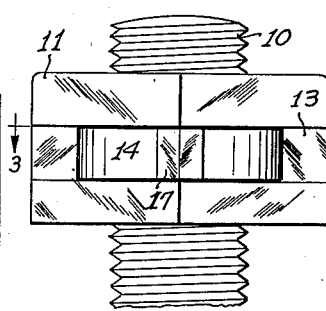
Figure 3:
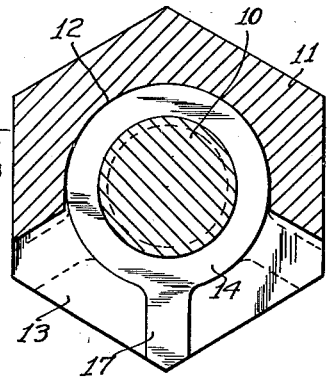
Figure 4:
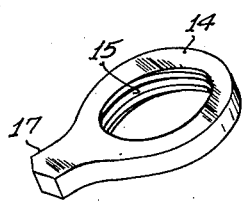
Figure 5:
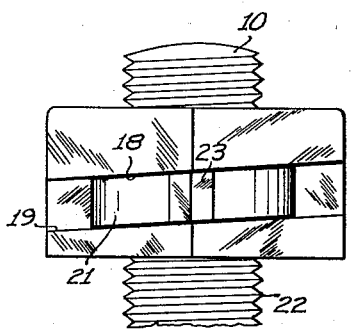
Figure 6:
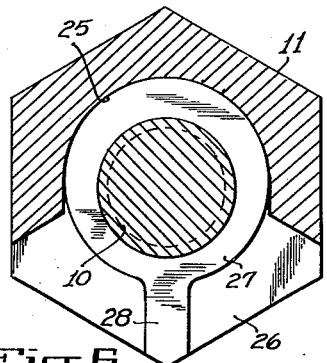
Figure 7:
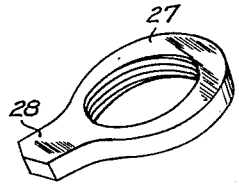
Figure 8:
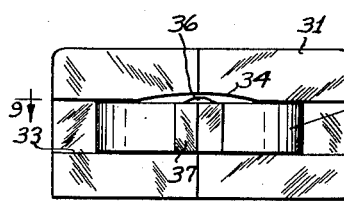
Figure 9:
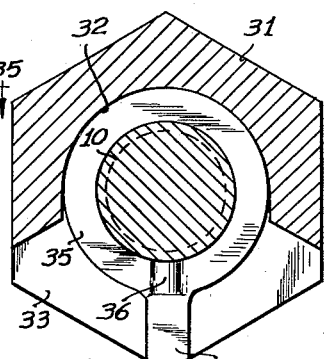
Figure 10:
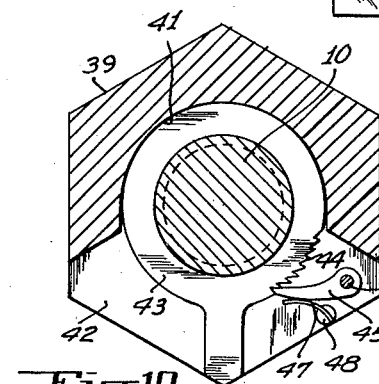
Figure 11:
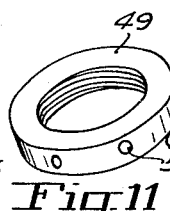

In the drawing, Figure 1 is a plan view of a nut and bolt embodying the present invention; Figure 2 is a fragmentary side elevational view thereof; Figure 3 is a transverse sectional view taken substantially along the line 3—3 of Figure 2; Figure 4 is a perspective view of the locking ring shown in Figures 1, 2 and 3; Figure 5 is a fragmentary side elevational view of a nut and bolt according to a modification of the invention; Figure 6 is a transverse sectional view similar to Figure 3, illustrating another modification; Figure 7 is a perspective view of the locking ring shown in Figure 6; Figure 8 is a side elevational view of a lock nut constructed in accordance with a further modification; Figure 9 is a transverse sectional view taken along the line 9—9 of Figure 8; Figure 10 is a transverse sectional view of a lock nut constructed in accordance with a still further modification of the invention; and Figure 11 is a perspective view of a locking ring in accordance with a modification of the structures shown in Figures 4 and 7.

Referring now to the drawing with particular reference to Figures 1 to 4, inclusive, the numeral 10 designates a bolt of conventional construction on which the nut 11 is threaded. The nut is formed with an internal annular groove 12 intermediate its ends and having one side communicating with a radially extending slot 13 formed in the side wall of the nut.

An annular locking ring 14 is rotatably mounted in the groove 12, the locking ring being internally threaded as shown at 15 in Figure 4 for engagement with the threads of the bolt and is adapted to be threaded on the bolt together with the nut 11. The annular locking ring 14 is rotatable in the groove 12 independently of the nut 11, and when threaded on the bolt a relative rotation between the locking ring and the nut will cause a binding action between the threads of the locking ring and the threads of the bolt, as well as a binding engagement with one side of the groove in the nut 11, the threads of the nut in turn being caused to bind with the threads of the bolt.

Access may be had to the locking ring through the side wall opening or slot 13 with any suitable tool for effecting relative rotational movement thereof with respect to the nut 11 to cause frictional or binding engagement thereof with the threads of the bolt. If desired, a projection may be provided on the rim of the annular locking ring 14 and which may extend radially into the slot 13 for facilitating rotation of the ring within the nut 11. As shown in the Figures 1 to 4, inclusive, the annular ring is provided with an integral radially extending arm 17 which, in the coaxially assembled position of the locking ring within the nut 11, extends radially outwardly through the slot 13. Upon manipulation of the arm 17 toward either direction as shown by the dotted lines in Figure 3 of the drawing, the ring in moving axially of the bolt will bind against one side of the groove 12, thereby producing a binding action of the threads of the ring with the threads of the bolt to securely lock the nut against movement.

As illustrated in Figure 2, the internal annular groove 12 and the slot 13 in the nut 11 are in a plane substantially parallel with the planes of the opposite ends of the nut 11. It will be obvious that this is not essential since they may be inclined at an angle as indicated in Figure 5. In the modification therein illustrated the annular groove 18 and slot 19, and also the locking ring 21, cooperatively arranged within the groove 18, are inclined at an angle. The angle of inclination may preferably differ from the angle of inclination of the threads 22 of the bolt 10. Upon manipulation of the arm 23 toward either direction from the central position, the inclination of the groove 18 and the corresponding inclination of the upper and lower surfaces of the ring 21 will cause the ring to bind upon both sides of the groove 18 and so produce a further axial binding action of the threads of the ring and nut upon the threads of the bolt.

In the first described modification the locking ring is of substantially uniform cross section throughout. In the further modification of the invention, illustrated in Figures 6 and 7, the annular groove 25 in the nut is slightly eccentric as regards the longitudinal axis of the nut. In other words, the side of the groove 25 diametrically opposite from the radial slot 26 is of gradually increased depth, and the locking ring 27 at a side thereof diametrically opposite from the lever arm 28 is of an increased width corresponding to the increase in depth of the groove 25 whereby to provide a cam formation on the ring. The cam formation on the ring 27 is normally seated in the wider part of the groove 25 whereby to permit free threading movement of the nut and ring on the bolt. Upon manipulation of the lever arm 28 toward either direction, the camming action of the ring will cause a binding thereof against the walls of the groove so as to lock the nut against movement on the bolt by producing a radial binding action against the threads of the bolt, as well as producing a binding engagement with one side of the nut and with the threads of the bolt.

The arrangement of the annular groove 25 and the locking ring 27 cooperatively fitted therein may be either in a plane parallel with the opposite end walls of the nut in the manner illustrated in Figure 2, or may be inclined at an angle with respect thereto in the manner as illustrated in Figure 5.

In Figures 8 and 9 is illustrated a further modification of the invention in which the nut 31 is provided with an internal annular groove 32 formed therein and a radially extending slot 33 in the side wall of the nut. One wall of the groove 32 is provided with a shallow axial recess 34 and the ring 35 has its adjacent surface formed with an axially extending tapered rib or hump 36 normally seated in the recess 34 of the groove. The nut is adapted to be threadable freely on a bolt together with the locking ring with the rib 26 positioned in the recess 34. Upon manipulation of the arm 37 of the ring in either direction, so that the rib 36 is moved toward the limits of the recess 34, the rib 36 will engage the side of the groove and cause a binding action of the ring therewith, resulting in a frictional engagement of the ring threads with the bolt threads, and wedging the ring between the opposite side walls of the groove to secure it firmly in position.

In Figure 10 a still further modification is illustrated in which the nut 39 is provided with an internal annular groove 41 and a radially extending slot 42 through one side wall thereof and within which is coaxially arranged the locking ring 43. The locking ring 43 is provided with a series of teeth 44 constituting ratchet teeth with which a pawl 45 is engageable, the pawl 45 being pivoted on a pin 46 positioned in the slot 42. The pawl is yieldably held in engagement with the teeth 44 by means of a leaf spring 47 suitably mounted as by pin 48 in the slot 42. In this construction the pawl 45 engages the ratchet teeth 44 to prevent accidental unlocking movement of the locking ring after the lever has been moved in a clockwise direction as viewed in Figure 10.

In Figure 11 is illustrated a locking ring 49 embodying a construction which may be used interchangeably with either one of the locking rings 14 or 27, it being appreciated, of course, that the ring 49 may be shaped for use with a concentric annular groove such as illustrated at 12 in Figure 3, or with an eccentric annular groove such as illustrated at 25 in Figure 6. The locking ring 49 is preferably provided with some form of tool engaging means for rotating the ring relative to the nut, the particular ring 49 being provided with radially extending holes 50 into which may be inserted an appropriate tool for rotating the ring.

While the invention has been described in the foregoing in what at present is considered to be preferred embodiments thereof, it is desired that it be understood that the invention is not to be necessarily so limited, since further modifications will readily occur to one skilled in the art. By the appended claims it is intended to include all such modifications and variations as fall within the true spirit and scope of the invention.

Having thus described the invention, what I claim is:

1. A nut machined from a homogeneous solid block of metal and having an axially extending bore and an internal screw thread, said nut having end faces and side walls extending between said end faces, means defining an annular groove in said nut intermediate its ends, a slot extending through a side wall of the nut and communicating with said groove, and a ring mounted loosely in said groove and having an internal screw thread for threading on a bolt together with the nut, said ring being adapted to be rotated independently of the nut by means projecting through the slot for locking said nut on said bolt.

2. A nut machined from a homogeneous solid block of metal and having an axially extending bore and an internal screw thread, said nut having end faces and side walls extending between said end faces, means defining an annular groove intermediate the ends of said nut and centric with said bore, annular means positioned in said groove coaxially with said nut and having an internal screw thread, said means being adapted for movement on a bolt independently of said nut, an opening through a wall of said nut communicating with said groove, a portion of said annular means extending into said opening and adapted for manual manipulation for effecting relative rotational movement of said means with respect to said nut.

3. A nut machined from a homogeneous solid block of metal and having an axially extending bore and an internal screw thread, said nut having end faces and side walls extending between said end faces, means defining an annular groove intermediate the ends of said nut and centric with said bore, a slot extending through a side wall of said nut and communicating with said groove, a locking ring positioned in said groove and adapted for threading on a bolt together with said nut, and means integral with said ring extending into said slot for effecting independent rotation of said ring with respect to said nut to lock said nut on said bolt.

4. A nut machined from a homogeneous solid block of metal and having an axially extending bore and an internal screw thread, said nut having end faces and side walls extending between said end faces, means defining an annular groove in said nut intermediate its ends, said groove being of greater diameter than said bore, a slot extending through a side wall of said nut and communicating with said groove, a ring mounted in said groove and having an internal screw thread, said ring being adapted for threading on a bolt together with said nut, and means on said ring engageable through said slot for rotating said ring relative to said nut.

5. A nut machined from a homogeneous solid block of metal and having an axially extending bore and an internal screw thread, said nut having end faces and side walls extending between said end faces, means defining an annular groove in said nut intermediate its ends, said groove being of greater diameter than said bore, a slot extending through a side wall of said nut and communicating with said groove, a ring mounted in said groove and having an internal screw thread, said ring being adapted for threading on a bolt together with said nut, and a radially extending arm on said ring positioned in said slot and adapted for manual manipulation for rotating said ring relative to said nut.

6. A nut machined from a homogeneous solid block of metal and having an axially extending bore and an internal screw thread, said nut having end faces and side walls extending between said end faces, means defining an annular groove in said nut intermediate its ends, a slot extending through a side wall of the nut and communicating with said groove, a ring mounted loosely in said groove and having an internal screw thread for threading on a bolt together with the nut, means on said ring for manipulating said ring independently of the nut, and means for securing said ring in an adjusted position relative to said nut.

7. A nut machined from a homogeneous solid block of metal and having an axially extending bore and an internal screw thread, said nut having end faces and side walls extending between said faces, means defining an annular groove intermediate the ends of said nut and centric with said bore, a ring positioned in said groove and having an internal screw thread, said ring being adapted for movement on a bolt independently of said nut, and a cam projection on said ring engageable with a wall of said groove upon relative rotation of said ring and said nut for securing the ring in an adjusted position relative to said nut.

8. A nut machined from a homogeneous solid block of metal and having an axially extending bore and an internal screw thread, said nut having end faces and side walls extending between said faces, means defining an annular groove intermediate the ends of said nut and centric with said bore, a slot extending through a side wall of said nut and communicating with said groove, an axially extending recess in one wall of said groove, a ring mounted loosely in said groove and having an internal screw thread, said ring being adapted for movement on a bolt independently of said nut, a manipulating lever projecting radially from said ring and disposed in said slot, and an axially extending rib on said ring normally seated in said recess and adapted upon manipulation of the lever to secure the ring in an adjusted position relative to the nut.

9. A nut machined from a homogeneous solid block of metal and having an axially extending bore and an internal screw thread, said nut having end faces and side walls extending between said faces, means defining an annular groove intermediate the ends of said nut and centric with said bore, an axially extending recess in one wall of said groove, a ring mounted loosely in said groove and having an internal screw thread, said ring being adapted for movement on a bolt independently of said nut, and an axially extending rib on said ring normally seated in said recess and adapted upon relative rotation of said ring and said nut to bind the threads of the nut against the bolt.

10. A nut machined from a homogeneous solid block of metal and having an axially extending bore and an internal screw thread, said nut having end faces and side walls extending between said faces, means defining an annular groove intermediate the ends of said nut and centric with said bore, a slot extending through a side wall of said nut and communicating with said groove, a ring mounted loosely in said groove and having an internal screw thread, said ring being adapted for movement on a bolt independently of said nut, a manipulating lever projecting radially from said ring and disposed in said slot, and a pawl and ratchet mechanism mounted in said slot for securing the ring against movement in the nut.

RANSOM L. PARK.